(12) United States Patent
Bennett

(10) Patent No.: US 9,535,993 B2
(45) Date of Patent: Jan. 3, 2017

(54) CREATIVE WORK REGISTRY

(75) Inventor: James D. Bennett, Hroznetin (CZ)

(73) Assignee: ENPULZ, LLC, Chicago, IL (US)

( * ) Notice: Subject to any disclaimer, the term of this patent is extended or adjusted under 35 U.S.C. 154(b) by 712 days.

(21) Appl. No.: 12/482,586

(22) Filed: Jun. 11, 2009

(65) Prior Publication Data

US 2009/0313226 A1 Dec. 17, 2009

Related U.S. Application Data

(60) Provisional application No. 61/060,650, filed on Jun. 11, 2008.

(51) Int. Cl.
*G06F 17/30* (2006.01)
*G06Q 30/02* (2012.01)

(52) U.S. Cl.
CPC ... *G06F 17/30864* (2013.01); *G06F 17/30017* (2013.01); *G06F 17/30244* (2013.01); *G06F 17/30781* (2013.01); *G06F 17/30858* (2013.01); *G06F 17/30861* (2013.01); *G06Q 30/02* (2013.01); *G06Q 30/0256* (2013.01); *G06Q 30/0283* (2013.01)

(58) Field of Classification Search
CPC .................... G06F 17/30861; G06F 17/30244; G06F 17/30017; G06F 17/30864; G06F 17/30781; G06F 17/30858; G06Q 30/02; G06Q 30/0283; G06Q 30/0256
USPC .................... 707/709, E17.08, E17.108, 914, 915,707/916, 917, 932, 999.006, 999.107
See application file for complete search history.

(56) References Cited

U.S. PATENT DOCUMENTS

| | | | | |
|---|---|---|---|---|
| 5,802,218 A | * | 9/1998 | Brailean | 382/275 |
| 6,771,704 B1 | * | 8/2004 | Hannah | 375/240.16 |
| 6,871,200 B2 | * | 3/2005 | MacQueen et al. | 707/770 |
| 7,840,033 B2 | * | 11/2010 | Kurzweil et al. | 382/114 |
| 2003/0061490 A1 | * | 3/2003 | Abajian | 713/176 |
| 2004/0220898 A1 | * | 11/2004 | Eguchi et al. | 707/1 |
| 2008/0059461 A1 | * | 3/2008 | Brock et al. | 707/6 |
| 2008/0077570 A1 | * | 3/2008 | Tang et al. | 707/5 |
| 2008/0288509 A1 | * | 11/2008 | Mysen et al. | 707/100 |

* cited by examiner

Primary Examiner — Srirama Channavajjala
(74) Attorney, Agent, or Firm — Galick & Markison; Bruce E. Garlick

(57) ABSTRACT

A search engine server supports crawling of third party servers communicatively coupled to the search engine server to gather vectors to web content, wherein the search engine server delivers a report to registered creative work owners by identifying vectors to web content that contain similarities to their works and by providing protection to the copyrighted creative works. The search engine server has components that identify similarities to the works of the registered owners of the creative works and provide protection by reporting to the registered owners as well as host third party servers, in case of textual, image, audio and video creative works. This service is an added value based service of the search engine server to the registered owners of the creative works upon service charge basis. The search engine server also provides additional services that include reporting to the host third party servers that contain web content having similarities to that of creative works of registered owners and assisting the third party servers to delete the content upon consideration.

20 Claims, 11 Drawing Sheets

FIG. 5

CreativeWorkProtection Web Page (www.creativework.com) 521

CREATIVE WORK PROTECTION.COM 541

Home | About | Contact Us | FAQ 551

Language: 547　English 549

CORRELATION RESULTS: Creative Work.xxx 543

VITAL DETAILS: 553
FILE NAME: Creative Work.xxx
Pages: 345
Lines: 11,856
Characters: 2,608,320
Registered Author: Charles C. Clerk Word Count: 34,567
Paragraphs: 988
Words: 652,080
Uploaded On: December 04, 2007

Creative Work.xxx: 555
...have a service, register your copyright work. Tools to load it up to a server. A digital signatures database to compare against...

Similarity Found: Work MNZ.xxx: 557
...have a service, register your copyright work. Tools to load it up to a server. A digital signatures database to compare against...

Correlate Again 583

Done

Client's Browser 595

CreativeWorkProtection Web Page (www.creativework.com) 621

Home  About  Contact Us  FAQ 651

CREATIVE WORK PROTECTION.COM 641

Language: 647 [English] 649

CORRELATION RESULTS: All-Right-Now.xxx 643

VITAL DETAILS: 653
FILE NAME: All-Right-Now.xxx
Work Length: 4 min. 10 Sec.
Uploaded On: December 04, 2007
Registered Artist: Charles C. Clerk Work Nature: Video File
Area of Work: Rock Music All-Right-Now.xxx: 655
_____Time Similarity Found: It's-OK.xxx: 657
_____Time ( Correlate Again ) 683

Client's Browser 695

Done

FIG. 6

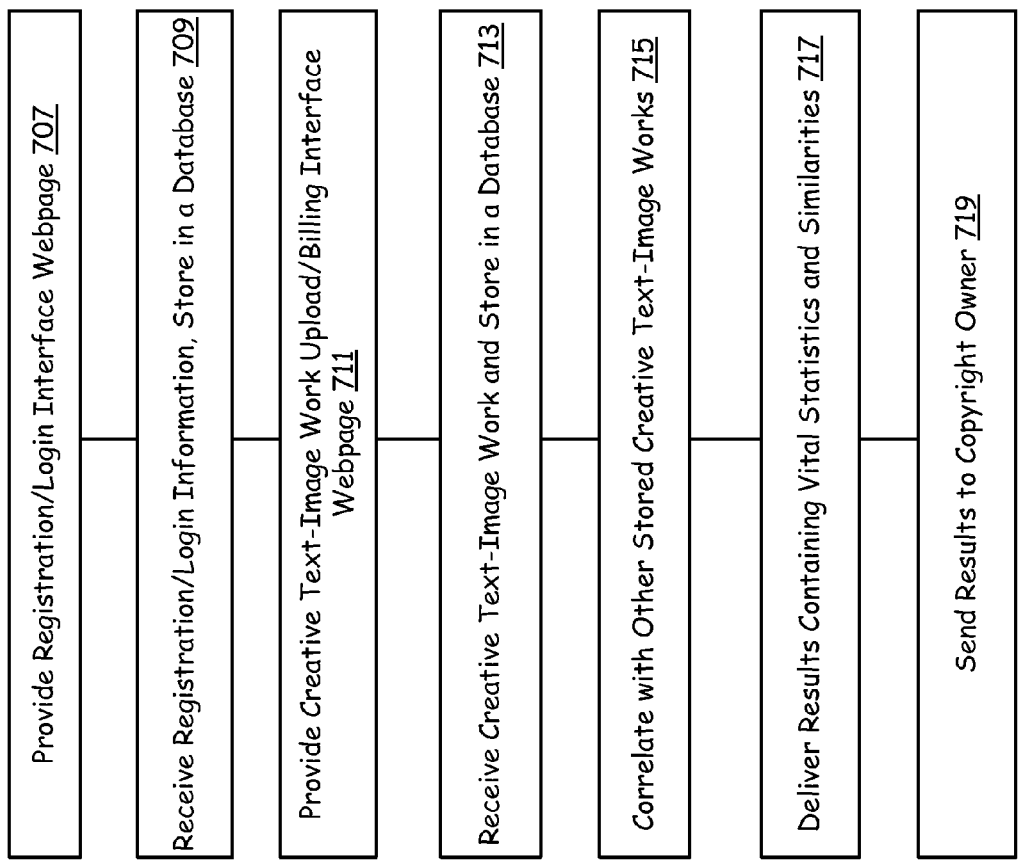

CREATIVE WORK REGISTRY

CROSS REFERENCES TO RELATED APPLICATIONS

The present application claims priority under 35 U.S.C. 119(e) to U.S. Provisional Application Ser. No. 61/060,650, filed Jun. 11, 2008, and having a common title with the present application, which is incorporated herein by reference in its entirety for all purposes.

BACKGROUND

1. Technical Field

The present invention relates generally to Internet infrastructures; and, more particularly, to search engines.

2. Related Art

The frequent use of search engines by users of business, commercial, scientific and other professional organizations and home users to identify web links of web sites that provide information related to a keyword has made them one of the most widely used tools for accessing content of the Internet. They make the Internet far more useful to the users and have contributed to the growth of the Internet enormously. Many search engines provide additional services to the users besides searching for web pages, images, audio and video recordings. For example, some search engines provide services such as providing headlines of news, providing access to news item links from various political, business, scientific, and other professional reporting services.

Many third party servers provide services that allow users to post family audio, video, text and images anonymously or by registration and allow public to download or view these posted content. That is, these third party servers are specifically set up for public viewing, access and download. But some of the media stored and served thereby is copyrighted and belongs to respective owners. However, owners are not in a position to identify who is posting their copyrighted material and where it is posted.

Such posting can happen from anywhere around the world. The servers who accept these posting often do not know who posts what, except if specifically informed so. These servers enable unwittingly millions of people to be violators of copyright laws. Copyright owners spend tens of thousands of dollars to find out who posted their material, and may still not be successful. And if this occurs too often, it becomes extremely hard to follow these activities. To take this on is a huge job and the owners get very little in return. Many servers that accept posting of material have in principle mechanisms involved to erase these materials from their sites, but they don't work efficiently, and need to be monitored constantly. For example, the users may provide feedback regarding copyrighted material and the third party servers may delete them upon consideration.

In addition, many other minor web sites post unauthorized copyrighted audio, video, text, and image content that are extremely hard to identify. These web sites allow downloading and viewing of the content, making copyright owners face huge losses in return. The copyright owners are not in a position to identify these users, delete content from these major or minor web sites, or take any action against them because of the complexities and difficulties involved in such works.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 5 is an exemplary schematic block diagram illustrating a snap shot of a results page containing details of the creative work containing text and report of similarities in web content;

FIG. 6 is an exemplary schematic block diagram illustrating a snap shot of a results page containing details of the creative work containing video content and report of similarities in web content;

FIG. 7 is a flow diagram illustrating functionality of a portion of the search engine server of FIG. 1;

DETAILED DESCRIPTION OF THE DRAWINGS

Figure 1:
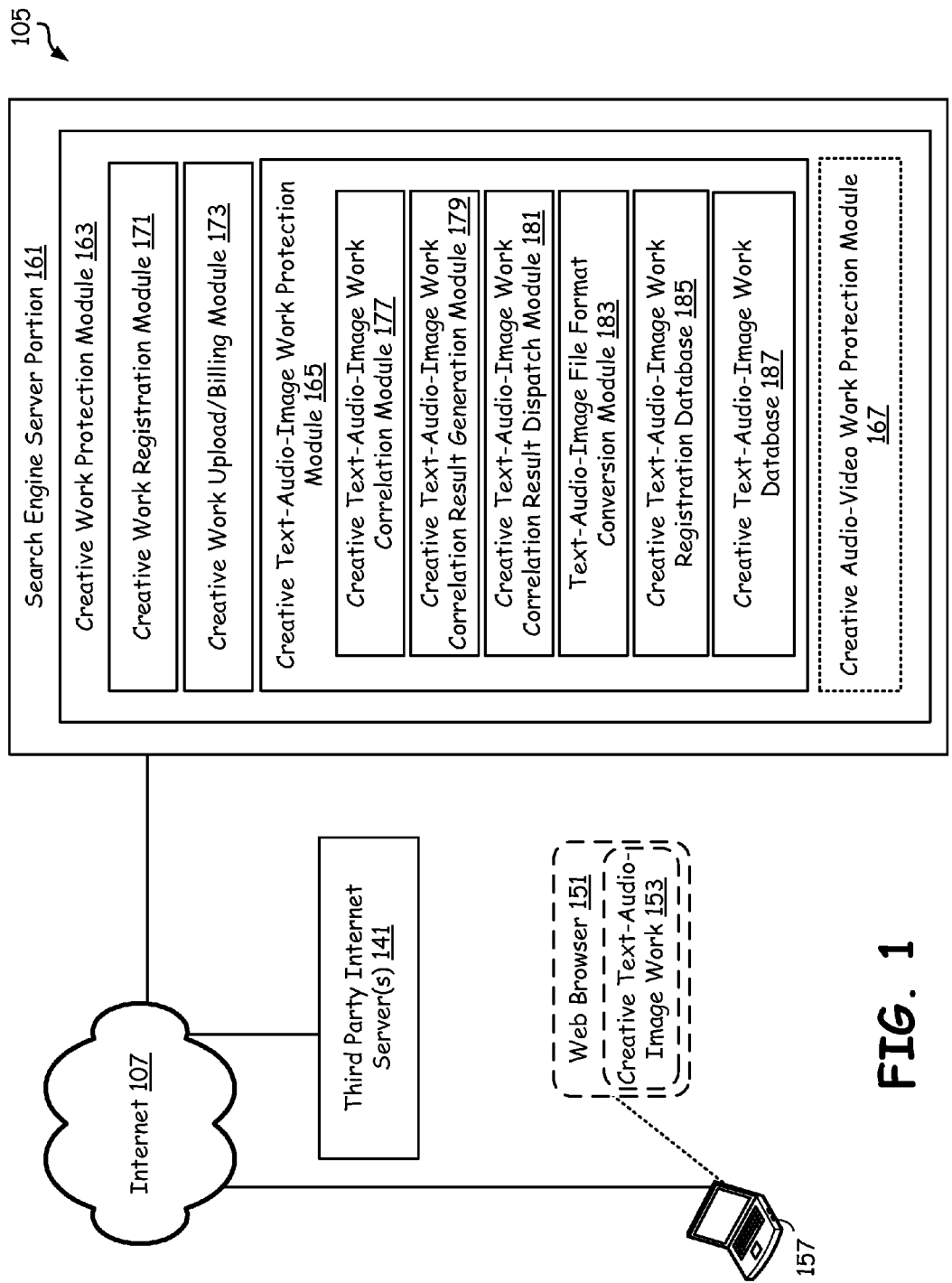
FIG. 1 is a schematic block diagram illustrating an Internet infrastructure containing a client device, third party servers and a portion of a (web browser accessible) search engine server, wherein a portion of the search engine server provides protection for creative works containing text and images, by identifying similarities with web text and image content and reporting back to registered owners of the creative works.

FIG. 1 is a schematic block diagram illustrating an Internet infrastructure 105 containing a client device 157, third party servers 141 and a portion of (web browser accessible) search engine server 161, wherein a portion of the search engine server 161 provides protection for creative works containing text and images 153, by identifying similarities with web text and image content and reporting back to registered owners of the creative works. The present invention relates to an additional value based copyright protection service from a search engine server (not shown). In specific, a portion of the search engine server (search engine server portion, hereafter) 161 provides protection to the creative works involving textual content, images 153 (and audio and video content, which are discussed with reference to the FIG. 2) by comparing the creative text-image works 153 with that of plurality of web content that contain textual content and/or images and generating report about results of comparison and reporting back to the registered owners of the creative text-image works 153.

This entire process of comparison with web content occurs during the crawling operation of the search engine server from web page to web page. The search engine server during crawling identifies textual content, audio content, and images in web pages as well as file attachments (such as one meant for downloading and viewing in a standard text reader) and submits the vectors of these web pages and file attachments to the search engine server portion 161. Thereafter, the search engine server portion 161 follows the vectors and identifies web pages and file attachments and compares the content with that of creative text-image works 153 of the registered owners. The search engine server, during crawling only submits those vectors to the web pages and file attachments that have not been compared before and the content have not been changed since last comparison.

The search engine server portion 161, in addition to reporting similarities back to the registered owners, also performs additional tasks such as reporting to the third party servers 141 regarding the possibility of copyright violations and also taking some actions such as assisting (with some arrangement with major host third party servers 141) to delete this web content, upon consideration that violate copyright laws.

The search engine server portion 161 provides web page interfaces to the owners of creative text-image works 153 that allow them to provide some personal information that may include user name, password, date of birth, address, email address, etc. Once registered, the owners of creative text-image works 153 are provided with web interfaces to login any time of their choice and upload their creative text-image works (the creative works may contain textual content alone, images alone or combinations of textual content, audio content, and images) 153 via web browser 151 to the search engine server portion 161. The creative text-image work files may be any of the standard text, image formats such as Microsoft Word format, Abode Reader format, '.jpeg' format, and '.bmp' format. The search engine server portion 161 stores these files in a database and converts them to a suitable format by separating text and images before further processing. In addition, once the creative text-image works 153 are uploaded, the search engine server portion 161 initiates a billing process based upon certain criteria. The billing may occur at the time of uploading or periodically. For example, the billing may be based upon a fixed price/creative text-image work 153, fixed price/number of characters in textual content of the creative text-image work 153, fixed price/image size/image of the creative text-image work 153, fixed price/report generated for a predetermined period such as a week or month, etc.

Once the creative text-image work 153 is acquired and stored, and once the billing process/agreement is completed, the search engine server portion 161 begins processing by segregating textual content, audio content, and images and then converting them to a standard predetermined format and again storing them. Then, based upon receiving of vectors from the search engine server during crawling, the processing by the search engine server portion 161 continues, by accessing the web text-image content or file attachments, storing them temporarily in a database. Then the search engine server portion 161 separates them into textual content, audio content, and images and converts these to the same predetermined format. Then, the search engine server portion 161 compares the textual content of converted creative text-image work with that of converted web text-image content and generates a report if similarities are identified. These reports are stored in a database. Also, for an additional fee, the search engine server portion 161 reports the similarities to the host thirds party servers 141 via some arrangement with these host third party servers 141 and automatically or by consideration assists in deleting these web text-image content.

The comparison itself, between the textual content of converted creative text-image work and that of converted web text-image content occurs in many possible ways. The first among them is comparison of keywords or phrases (partially determined by the registered owner of the creative text-image work). This may be specifically applicable if the keywords or phrases are registered or copyrighted. Any matches would be considered as containing similarities. The second among these identifies number of words or number of sentences that contain similarities between the textual content by comparing character by character. The similarities are considered to be identified if the number of adjacent characters matches beyond a correlation threshold. The correlation threshold may be, for example, 20 adjacent characters or 20 adjacent words. Once this correlation threshold is exceeded, the search engine server portion 161 continues to compare until all of the similarities are identified and then generates a report on this basis (refer to the FIG. 5 for an exemplary snapshot of report). Other methods of comparison are also contemplated.

The correlation between the image content of converted creative text-image work and that of converted web text-image content occur on the basis of pixel by pixel comparison. The converted images are resized to a predetermined standard size and then are compared pixel by pixel for identifications of similarities. A correlation threshold may determine that a similarity is identified. Once this correlation threshold is exceeded (which might be number of adjacent pixels), for example, the search engine server portion 161 continues to compare until all of the similarities are identified and then generates a report on this basis. Other methods of comparison are also contemplated.

The search engine server portion 161 includes a plurality of modules to enable the functionalities mentioned in the above paragraphs. A creative work protection module 163 performs all of the above mentioned functions as well as providing copyright protection to registered owners of audio and/or video recordings (refer to the description of FIG. 2 for additional modules of the creative work protection module 163, as related to copyright protection of audio and video recordings). The creative work protection module 163 includes creative work registration module 171 and creative work upload/billing module 173 to perform functions of registration, logging in and billing. In addition, the creative work protection module 163 also includes two major modules, viz., creative text-image work protection module 165 and creative audio-video work protection module 167

Figure 2:
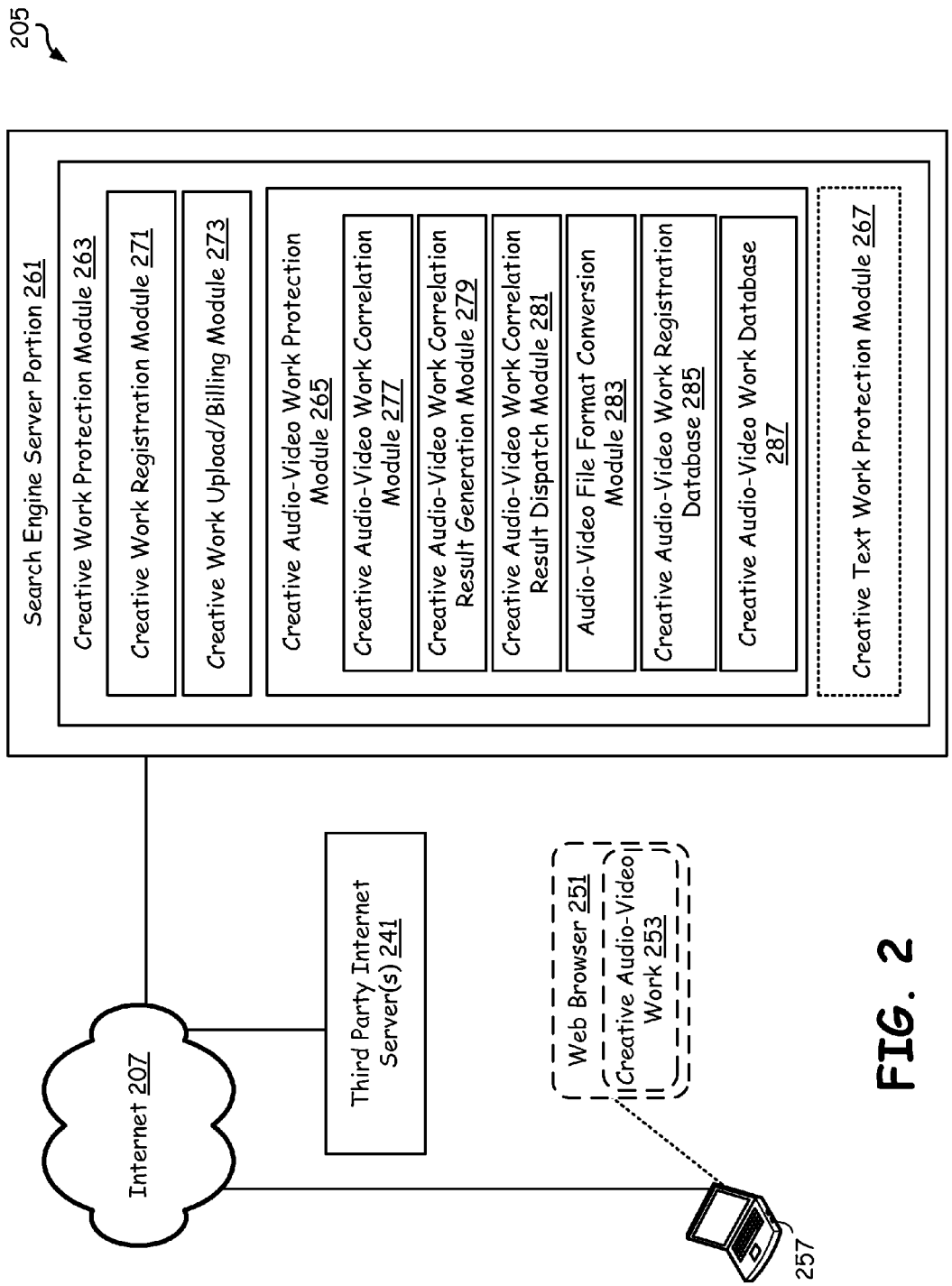
FIG. 2 is a schematic block diagram illustrating an Internet infrastructure, in continuation of FIG. 1, wherein a portion of the search engine server provides protection for creative works containing audio and video content, by identifying similarities with web audio and video content and reporting back to registered owners of the creative works.

(which is dealt in detail with reference to FIG. 2). The creative text-image work protection module 165 includes creative text-image work correlation module 177 which performs textual content and image comparisons, creative text-image work correlation result generation module 179 which generates reports, creative text-image work correlation result dispatch module 181 which delivers reports to the registered owners and/or host third party server 141 and text-image file format conversion module 183. The creative text-image work protection module 165 also includes databases to store information such as registration information and uploaded creative text-image works. The creative text-image work protection module 165 includes creative text-image work registration database 185 and creative text-image work database 187.

For example, an author of a copyrighted material (that includes several pages of written text and few images or diagrams), may want to protect his/her work being downloaded from third party servers 141. The author may not be aware of everything that goes on in third party servers 141 and may not know who is violating his/her rights. Therefore, the author may decide to register with the service of the search engine server. After registration, the author may upload an electronic version of his/her work in a standard file format and fulfill the service charge obligations.

Then, the search engine server portion 161 stores this file, segregates textual content from images or diagrams. The search engine server portion 161 then converts these textual content, audio content, and images or diagrams to a predetermined format. For example, the textual content may be converted to '.txt' format while the diagrams or images may be converted to '.jpg' format. Then, upon receiving vectors from the search engine server during crawling operation, the search engine server portion 161 begins to acquire the web content directed by the vectors and begins the comparison process. If no similarities are found, then no reports are generated and the process temporarily ends there.

On the contrary, if similarities are detected, then the search engine server portion 161 generates a report that may contain host third party server 141 details, vectors associated with the web content as well as the areas of similarity in textual content, audio content, and images and stores them in a database. Then, the accumulated reports over a predetermined period of time such as a day, week or month are formatted in a readable manner and submitted to the viewing of the author. The reports may be sent via email to the author, or may be made available on a webpage upon logging into the search engine server portion 161. If requests are made by the author for additional services such as sending reports to some major web sites that freely allow its users to post any material, the reports are generated and sent to these web sites for further consideration. The author, upon viewing the report may is able to identify these web sites which allow its users to view or download the copyrighted material without the author's permission and to take appropriate actions upon these violators.

FIG. 2 is a schematic block diagram illustrating an Internet infrastructure 205, in continuation of FIG. 1, wherein a portion of the search engine server 261 provides protection for creative works containing audio and video content, by identifying similarities with web audio and video content and reporting back to registered owners of the creative works. Specifically, the search engine server portion 261 provides protection to the creative works involving creative audio-video works (copyrighted works containing audio recordings alone or audio and video recordings) 253 by comparing the creative audio-video works 253 with that of web content that contain downloadable or on-site-playable audio or video recordings and generating report about results of comparison and reporting back to the registered owners of the creative audio-video works 253.

This continuing process of comparison with web content occurs during the crawling operation of the search engine server (not shown). The search engine server, during crawling operation identifies audio and video recordings in web pages as well as file attachments (downloadable audio or video recordings from various artists or producers of music and movies, speech, educational audio-video material, professional organization related audio-video material, independent copyrighted audio-video material etc.) and submits the vectors of these web pages and file attachments to the search engine server portion 261. The search engine server portion 261 follows the vectors and identifies web pages and file attachments and compares the content with that of creative audio-video works 253 of the registered owners. The search engine server portion 261, during crawling, only submits those vectors to the web pages and file attachments that have not been compared before and the content have not been changed since last comparison. This web content containing audio-video recordings typically and mainly are located in major websites that allow free uploading and public access to the users of these sites, while some other minor websites may also make audio and video recordings available for the public, some of which may be unauthorized. By direct or tacit agreement with many of these major sites, the search engine server portion 261 is able to provide additional services to the registered owners of the creative audio-video works 253 such as reporting to the third party servers 241 regarding the possibility of copyright violations and also assisting to delete these unauthorized web content, upon consideration.

The search engine server portion 261 provides web page interfaces to the owners of creative audio-video works 253 that allow them to register one time initially by providing requested information, login at any time thereafter and upload their creative audio-video works 253 using a web browser 251 from the client device 257. The creative audio-video work files may be any of standard audio or video formats such as MP3, WMA, WAV, OGG, AVI, MPEG-1, MPEG-2, and WMV. The search engine server portion 261 stores these files in a database and converts them to a suitable format by: (i) In case of audio, to a predetermined audio format such as WAV; and (ii) In case of video, by separating audio and video portions and then converting them to a predetermined audio and video formats such as WAV and MPEG-2 respectively. In addition, once the creative audio-video works 253 are uploaded, the search engine server portion 261 initiates a billing process based upon certain criteria. The billing may occur at the time of uploading or periodically. For example, the billing may be based upon a fixed price/creative audio work, fixed price/creative video work, fixed price/minute of the creative audio-video work, fixed price/report generated for a predetermined period such as a week or month, etc.

Next, upon receiving vectors from the search engine server during crawling, the processing by the search engine server portion 261 continues by accessing the web audio or video content or file attachments, storing them temporarily in a database. Then the search engine server portion 261, in case of audio recordings, converts them to the same predetermined format that was used in case of creative audio work. In case of video recordings, the search engine server portion 261 separates audio and video portions converts them to the same predetermined formats that were used in case of creative video work. Then, the search engine server portion 261 compares the audio or video content of converted creative audio-video work with that of converted web audio-video content and generates a report if similarities are identified. These reports are stored in a database. Also, for an additional fee, the search engine server portion 261 reports the similarities to the host thirds party servers 241 via some arrangement with these host third party servers 241 and automatically or by consideration assists in deleting these web audio-video content. Alternatively, the search engine server portion 261 may also provide provisions for fees for each upload and download of the web audio-video content available in third party servers 241.

In case of audio recordings, the comparison occurs in many possible ways. The first among them is bit by bit comparison. The similarities are considered to be identified if the number of adjacent bits matches beyond a correlation threshold. The correlation threshold may be, for example, 256 adjacent bits. Once this correlation threshold is exceeded, the search engine server portion 261 continues to compare until all of the similarities are identified and then generates a report on this basis. Alternatively, to identify those web audio content having similarities, that are manipulated in someway (such as recording using a microphone), the search engine server portion 261 may resort to converting the recordings to analog forms and then comparing them. Other methods of comparison are also contemplated.

In case of video recordings, the digital signatures are identified and compared as a first step. As a next step, the comparison of audio portion of the video recording is performed, which occurs in a similar fashion as the comparison that occurs in case of audio recordings mentioned before. If no similarities are found, the video portions of the recording are compared. This occurs on the basis of frame by frame comparison. The similarities are considered to be identified if the number of adjacent frames matches beyond a correlation threshold. The correlation threshold may be, for example, 256 adjacent frames. Once this correlation threshold is exceeded, the search engine server portion 261 continues to compare until all of the similarities are identified and then generates a report on this basis. Other methods of comparison are also contemplated. The reports may be presented in case of both audio and video recordings, in a graphical manner (refer to the FIG. 6 for an exemplary snapshot of report).

The search engine server portion 261 includes a plurality of modules to enable the functionalities mentioned in the above paragraphs. A creative work protection module 263 (163 in FIG. 1) performs all of the above mentioned functions as well as providing copyright protection to registered owners of textual content and/or images (refer to the description of FIG. 1 for additional modules of the creative work protection module 263, as related to copyright protection of textual content, audio content, and images). The creative work protection module 263 includes creative work registration module 271 (171 in FIG. 1) and creative work upload/billing module 273 (173 in FIG. 1) to perform functions of registration, logging in and billing.

The creative work protection module 263 also includes two major modules, viz., creative text-image work protection module 267 (165 in FIG. 1) and creative audio-video work protection module 265. The creative audio-video work protection module 265 includes creative audio-video work correlation module 277 which performs audio and video comparisons, creative audio-video work correlation result generation module 279 which generates reports, creative audio-video work correlation result dispatch module 281 which delivers reports to the registered owners and/or host third party server 241 and audio-video file format conversion module 283. The creative audio-video work protection module 265 also includes creative audio-video work registration database 285 and creative audio-video work database 287.

For example, an artist of copyrighted rock music may want to prevent his/her work being downloaded (or played) from the third party servers 241 without permission. Therefore, the artist may decide to register with the creative work protection service of the search engine server. After registration, the artist may upload, for example, a WAV format recording of the rock music and fulfill the service charge obligations. Alternatively, the search engine server portion 261 also allows the artist to upload the rock music in many possible formats.

Then, the search engine server portion 261 stores the rock music file. The search engine server portion 261 then converts this recording to a predetermined format. Then, upon receiving vectors of the audio content from the search engine server during crawling operation, the search engine server portion 261 begins to acquire the audio content directed by the vectors and begins the comparison process. If no similarities are found, then no reports are generated and the process temporarily ends there. On the contrary, if similarities are detected, then the search engine server portion 261 generates report that may contain host third party server 241 details, vectors associated with the audio content as well as the areas of similarity in the rock music and stores them in a database. Then, the accumulated reports over a predetermined period of time such as a day, week or month are formatted in a readable manner and submitted to the viewing of the artist, either via email or via webpage interface upon logging into the search engine server portion 261. If requests are made by the artist for additional services such as sending reports to some major web sites that freely allow its users to post audio recordings, the reports are generated and sent to these web sites for further consideration. The artist, upon viewing the report may is able to identify these web sites which allow its users to view or download the rock music without the author's permission and to take appropriate actions upon these violators.

Figure 3:
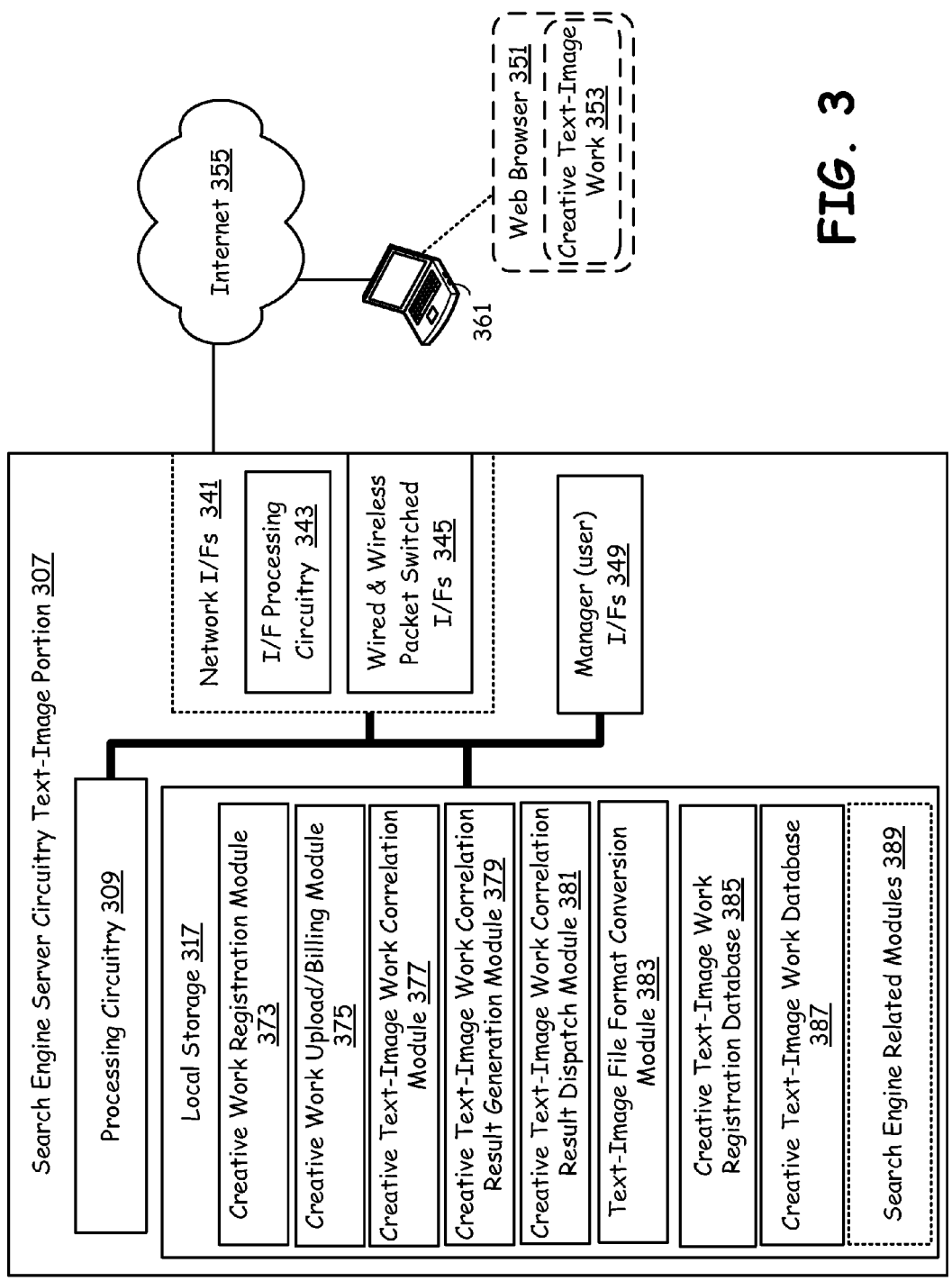
FIG. 3 is a schematic block diagram illustrating components of a portion of the search engine server constructed in accordance with the embodiment of FIG. 1 of the present invention.

FIG. 3 is a schematic block diagram illustrating components of a portion of the search engine server 307 constructed in accordance with the embodiment of FIG. 1 of the present invention. Search engine server circuitry text-image portion 307 may in part or full be incorporated into any computing device that operates as an Internet based server. The search engine server circuitry text-image portion 307 generally includes processing circuitry 309, local storage 317, manager interfaces 349, and network interfaces 341. These components communicatively couple to one another via one or more of a system bus, dedicated communication pathways, or other direct or indirect communication pathways. The processing circuitry 309 may be, in various embodiments, a microprocessor, a digital signal processor, a state machine, an application specific integrated circuit, a field programming gate array, or other processing circuitry.

Local storage 317 may be random access memory, read-only memory, flash memory, a disk drive, an optical drive, or another type of memory that is operable to store computer instructions and data. The local storage 317 stores/instantiates instructions/data that support the creative work registration module 373 and the creative work upload/billing module 375 to perform functions of registration, logging in and billing. Each of the modules described herein (not limited to the modules described in FIG. 3) may be instantiated by hardware, software, and/or a combination of hardware and software. In addition, the local storage 317 stores instructions/data that support the creative text-image work correlation module 377, which performs textual content and image comparisons, creative text-image work correlation result generation module 379 which generates reports, creative text-image work correlation result dispatch module 381 which delivers reports to the registered owners and/or host third party server (not shown) and text-image file format conversion module 383. The local storage 317 also includes creative text-image work registration database 385 to store registration, logging in and billing information of the registered owners and creative text-image work database 387 to store creative text-image work 353 of registered owners. In addition, the illustration shows search engine related modules 389 that perform search engine operations.

The network interfaces 341 contain wired and wireless packet switched interfaces 345 and may also contain built-in or an independent interface processing circuitry 343. The network interfaces 341 allow the search engine server circuitry text-image portion 307 to communicate with client devices such as 361 and to upload creative text-image works 353 via a web browser 351 and to deliver results. The manager interfaces 349 may include a display and keypad interfaces. These manager interfaces 349 allow the user at the search engine server circuitry text-image portion 307 to control aspects of the present invention. The client device 361 illustrated are communicatively coupled to the search engine server circuitry text-image portion 307 via an Internet 355.

In other embodiments, the search engine server circuitry text-image portion 307 of the present invention may include fewer or more components than are illustrated as well as lesser or further functionality. In other words, the illustrated search engine server circuitry text-image portion is meant to merely offer one example of possible functionality and construction in accordance with the present invention.

Figure 4:
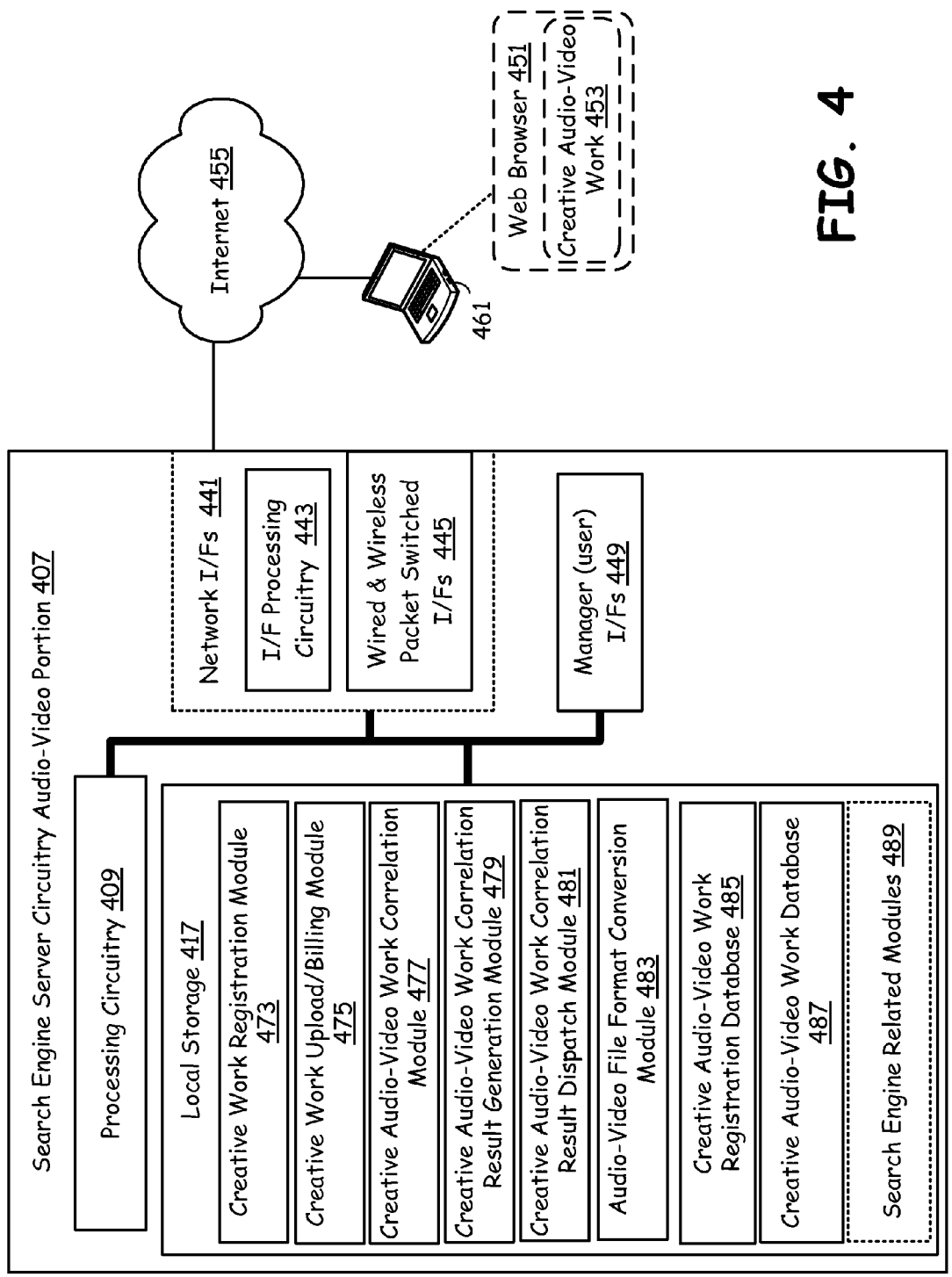
FIG. 4 is a schematic block diagram illustrating components of a portion of the search engine server constructed in accordance with the embodiment of FIG. 2, in continuation of FIG. 3, of the present invention.

FIG. 4 is a schematic block diagram illustrating components of a portion of a search engine server constructed in accordance with the embodiment of FIG. 2, in continuation of FIG. 3, of the present invention. Search engine server circuitry audio-video portion 407 may in part or full be incorporated into any computing device that operates as an Internet based server. The search engine server circuitry audio-video portion 407 generally includes processing circuitry 409 (309 of FIG. 3), local storage 417 (317 of FIG. 3), manager interfaces 449 (349 of FIG. 3) and network interfaces 441 (341 of FIG. 3). These components communicatively couple to one another via one or more of a system bus, dedicated communication pathways, or other direct or indirect communication pathways. The processing circuitry 409 may be, in various embodiments, be a microprocessor, a digital signal processor, a state machine, an application specific integrated circuit, a field programming gate array, or other processing circuitry.

Local storage 417 may be random access memory, read-only memory, flash memory, a disk drive, an optical drive, or another type of memory that is operable to store computer instructions and data. The local storage 417 stores instructions/data to instantiate at least part of creative work registration module 473 (373 of FIG. 3) and creative work upload/billing module 475 (375 of FIG. 3) to perform functions of registration, logging in and billing. In addition, the local storage 417 stores instructions/data to instantiate at least a portion of creative audio-video work correlation module 477 which performs audio and video content comparisons between creative audio-video work 453 of registered owners and audio-video content of third party servers (not shown), creative audio-video work correlation result generation module 479 which generates reports, creative audio-video work correlation result dispatch module 481 which delivers reports to the registered owners and/or host third party server and audio-video file format conversion module 483. The local storage 417 also stores instructions/data to instantiate at least a portion of creative audio-video work registration database 485 to store registration, logging in and billing information of the registered owners and creative audio-video work database 487 to store creative audio-video work 453 of the registered owners. In addition, the illustration shows search engine related modules 489 that perform search engine operations.

The network interfaces 441 contain wired and wireless packet switched interfaces 445 and may also contain built-in or an independent interface processing circuitry 443. The network interfaces 441 allow the search engine server circuitry audio-video portion 407 to communicate with client devices such as 461 and to upload creative audio-video works 453 via a browser 451 and to deliver results. The manager interfaces 449 may include a display and keypad interfaces. These manager interfaces 449 allow the user at the search engine server circuitry audio-video portion 407 to control aspects of the present invention. The client device 461 illustrated are communicatively coupled to the search engine server circuitry audio-video portion 407 via Internet 455.

In other embodiments, the search engine server circuitry audio-video portion 407 of the present invention may include fewer or more components than are illustrated as well as lesser or further functionality. In other words, the illustrated search engine server circuitry audio-video portion is meant to merely offer one example of possible functionality and construction in accordance with the present invention.

FIG. 5 is an exemplary diagram illustrating a snap shot of a results page containing details of a creative work containing text and reporting of similarities in web content. Specifically, the exemplary snap shot illustrated shows a creative text work correlation (comparison) results page 505 delivered to a client's browser 595 of client device, containing statistics of the creative text work and selected portions of text that are similar. The creative text work correlation results page 505 delivered may contain a page title such as 'CreativeWorkProtection Web Page (www.creativework.com)' 521. It may also contain a title such as 'CREATIVE WORK PROTECTION.COM' 541 and a tool bar 551 providing access to other pages of the search engine server portion. A language 547 selection tool 549 may also be provided, that allows user to choose a language in the results pages. A sub-title that provides the name of the creative text work in consideration such as 'CORRELATION RESULTS: Creative Work.xxx' 543 may also be provided.

One of the windows in the creative text work correlation (comparison) results page 505 may provide statistics of the creative text work in consideration such as 'DETAILS:' 553 followed by details such as file name, word count, number of pages, number of paragraphs, number of lines, number of words, number of characters, uploaded on and registered author. Additional statistics related to the web text content or file attachments in which the similarity is found such as web site, web page/file attachment link, web page/file statistics and the locations within the web page/file where similarity is found may also be provided in this window (not shown).

A second window illustrated provides the file name of the creative text work of a registered owner such as 'Creative Work.xxx:' 555 followed by the text where similarities are found. A third window illustrated provides the file name of the web text content posted by a third party server such as 'Similarity Found: Work MNZ.xxx:' 557 followed by the text that contains the similarities. The author may be able to decide whether to ignore the similarity found or to take any necessary actions. Also, a 'Correlate Again' button 583 provides options to the author to continue to the next similarity either within the current web page/file text content or in another web page/file.

FIG. 6 is an exemplary diagram illustrating a snap shot of a results page 605 containing details of the creative work containing video content and a report of similarities in web content. In specific, the exemplary snap shot illustrated shows a creative video work correlation (comparison) results page 605 delivered to a client's browser 695 of client device, containing statistics of the creative video work and graphical representation of areas of similarity. The creative video work correlation results page 605 delivered may contain a page title such as 'CreativeWorkProtection Web Page (www.creativework.com)' 621. It may also contain a title such as 'CREATIVE WORK PROTECTION.COM' 641 and a tool bar 651 providing access to other pages of the search engine server portion. A language 647 selection tool 649 may also be provided, that allows user to choose a language in the results pages. A sub-title that provides the name of the creative video work in consideration such as 'CORRELATION RESULTS: All-Right-Now.xxx' 643 may also be provided.

A first window in the creative video work correlation (comparison) results page 605 may provide statistics of the creative video work in consideration such as 'DETAILS:' 653 followed by details such as file name, work nature, work length, area of work, uploaded on and registered artist. Additional statistics related to the web video content or file attachments in which the similarity is found such as web site, web video content/file attachment link, web video content/file statistics and the locations within the web video content/file where similarity is found may also be provided in this window (not shown).

A second window illustrated provides the file name of the creative video work of a registered owner such as 'All-Right-Now.xxx:' 655 followed by some graphical representation of the length of the creative video work. A third window illustrated provides the file name of the web video content/file attachment posted by a third party server such as 'Similarity Found: It's-OK.xxx:' 657 followed by a graphical representation similar to that of the second window depicting the areas where similarity found. The artist is able to take necessary actions based upon observation of displayed similarities. Also, a 'Correlate Again' button 683 provides options to the artist to continue to the next similarity in another web video content/file.

FIG. 7 is a flow diagram illustrating functionality 705 of a portion of the search engine server of FIG. 1. The functionality of a portion of the search engine server (hereafter, search engine server portion) begins at a block 707 when an owner of a creative text-image work is provided with registration/login interface webpage. At a next block 709, the search engine server portion receives registration information if the owner is interacting with the search engine server portion for the first time and stores this information in a database. In subsequent interactions, the search engine server portion verifies login information and allows the owner to access services of the search engine server portion. The registration information may contain user name, password, date of birth, address, email address and other relevant information.

At a next block 711, the search engine server portion provides creative text-image work upload/billing interface. The owner may upload any number of creative text-image works in subsequent visits (after initial registration), and the billing may occur on one of many possible ways. This includes a fixed price/creative text-image work, fixed price/number of characters in textual content of the creative text-image work, fixed price/image size/image of the creative text-image work, fixed price/report generated for a predetermined period such as a week or month, etc. That is, the billing may occur immediately after uploading of creative text-image works or may occur periodically based upon an agreement with the registered owner. And the service may be provided for a fixed period of time such as one year or two years depending upon agreement with the registered owner.

At a next block 713, the search engine server portion receives creative text-image works and stores them in a database. At a next block 715, the search engine server portion correlates the creative text-image work with that of web content, vectors of which are delivered by the search engine server during crawling operation. Then, search engine server portion generates a report containing all of the website links (together with vectors of web pages or files contained in the web sites) that contain text or images having similarities with that of content of creative text-image works. At a next block 717, the search engine server portion delivers results containing statistics of the creative text-image works, along with similarities found. In a final block 719, the search engine server portion sends results to the registered owner, and upon agreement with registered owner and host third party servers, to the host third party servers.

Figure 8:
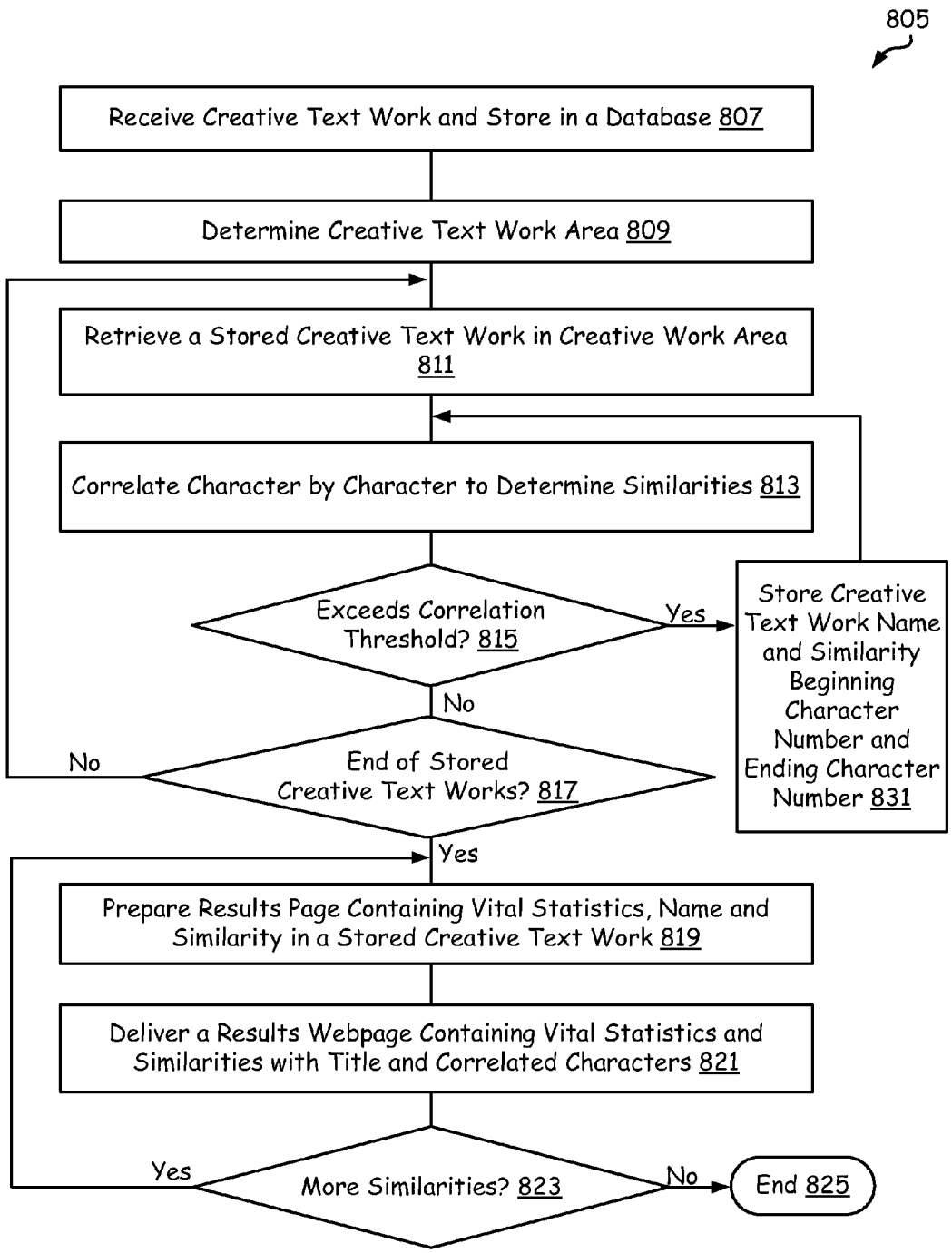
FIG. 8 is a flow diagram illustrating functionality of a portion of the search engine server of FIG. 1 in detail, with the creative work containing text in consideration.

FIG. 8 is a flow diagram illustrating functionality of a portion of the search engine server of FIG. 1 in detail, with the creative work containing text in consideration. The detailed functionality concerning creative text works of a registered owner begins at a block 807, where the search engine server portion receives creative text works and stores them in a database. To make this possible, the search engine server portion provides webpage interfaces to the registered owner to upload one or more creative text works. At a next block 809, the search engine server portion determines the area of the creative text work. For example, the area may be photographs, art work, paintings, pictures of cartoon characters etc. This is optional, if the registered owner provides such information and in this case the search engine server portion may not compare with web text content of web sites that do not belong to the area of creative text work.

At a next block 811, the search engine server portion retrieves stored creative text work in a given text area. At a next block 813, the search engine server portion correlates character by character with that of web text content to determine similarities. At a next decision block 815, the search engine server portion determines if the similarities exceed a predetermined correlation threshold. If yes, then the search engine server portion stores creative text work name along with web page details and similarity beginning character number and ending character number, at a next block 831. Then, the processes of blocks 813 and 815 are repeated. If not at the decision block 815, at a next decision block 817, the search engine server portion determines if all of the creative text works of the registered owner are compared. If not, with a next creative text work, the processes of blocks 811, 813, 815 and 831 are repeated. In another embodiment, the comparison may occur on the basis of keywords, which is not shown in the flowchart.

If yes at the decision block 817, then the search engine server portion prepares a results page (from the stored information of similarities) containing statistics, name and web links of the text that contains similarities along with additional information, at a next block 819. Then, at a next block 821, the search engine server portion delivers the results page containing statistics and similarities with title and correlated characters. At a next decision block 823, the search engine server portion determines if more similarities within the same webpage or in another webpage (that belongs to the creative text works of the registered owner) are found. If yes, then the processes of blocks 819 and 821 are repeated to generate addition results pages. If not, at a final block 825, the functionality ends.

Figure 9:
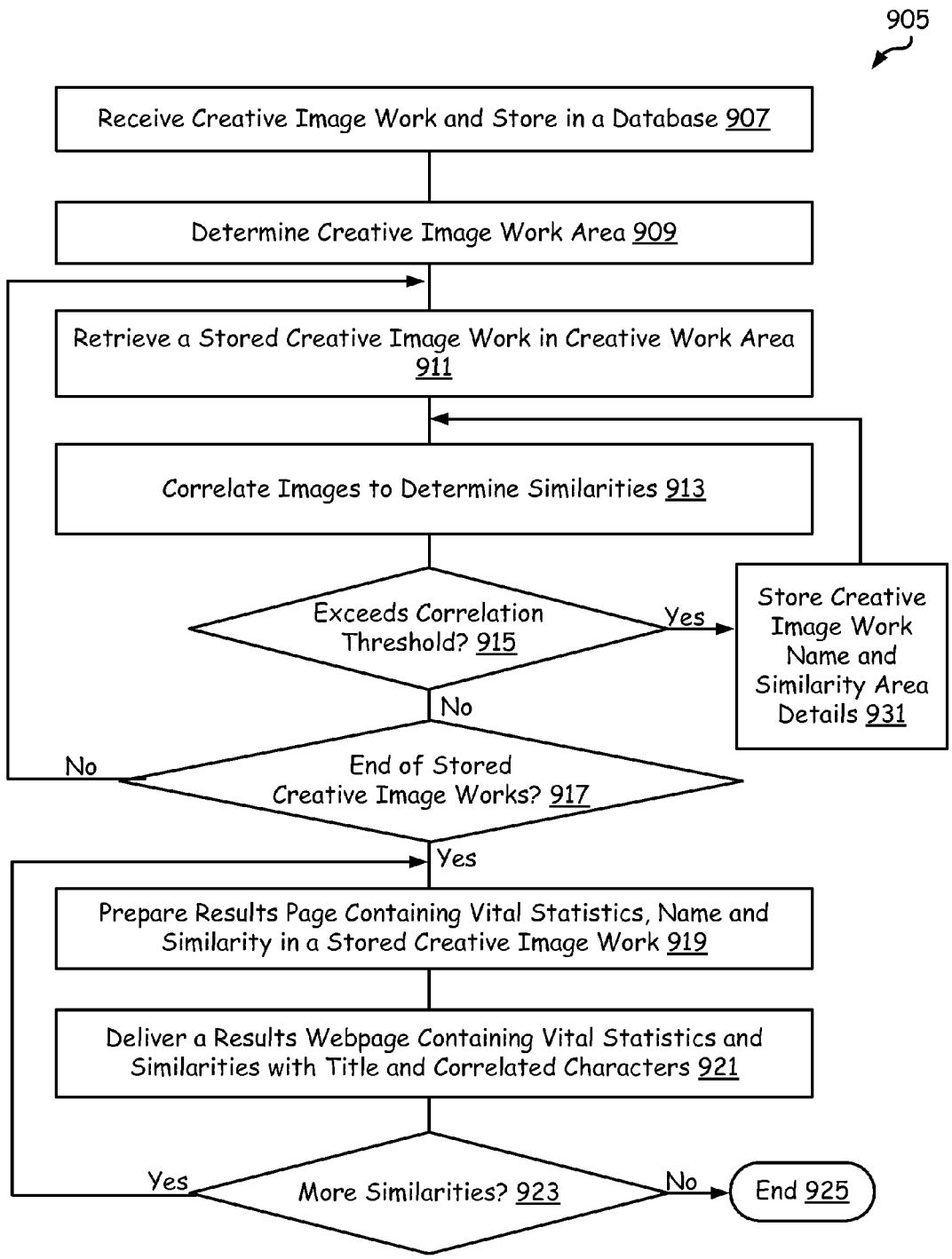
FIG. 9 is a flow diagram illustrating functionality of a portion of the search engine server of FIG. 1 in detail, with the creative work containing images in consideration.

FIG. 9 is a flow diagram illustrating functionality 905 of a portion of the search engine server of FIG. 1 in detail, with the creative work containing images in consideration. The detailed functionality concerning creative image works begins at a block 907, where the search engine server portion receives creative image works and stores them in a database. The search engine server portion provides webpage interfaces to a registered owner of the creative image works to upload one or more creative image works. At a next block 909, the search engine server portion determines the area of the creative image work. For example, the area may be photographs, art work, paintings, pictures of cartoon characters etc. The area of the creative image work is determined only if the registered owner provides such information. In this case, the search engine server portion may not compare with web image content that do not belong to the area of creative image work.

At a next block 911, the search engine server portion retrieves stored creative image work in a given image area. At a next block 913, the search engine server portion correlates images pixel by pixel (after converting formats to a predetermined image format and resizing the images) with that of web image content to determine similarities. At a next decision block 915, the search engine server portion determines if the similarities exceed a predetermined correlation threshold. If yes, then the search engine server portion stores creative image work name along with web page details and similarity area details, at a next block 931. Then, the processes of blocks 913 and 915 are repeated. If not at the decision block 915, at a next decision block 917, the search engine server portion determines if all of the creative image works of the registered owner are compared. If not, with a next creative image work, the processes of blocks 911, 913, 915 and 931 are repeated.

If yes at the decision block 917, then the search engine server portion prepares a results page (from the stored information of similarities) containing statistics, name and web links of the image that contains similarities along with additional information, at a next block 919. Then, at a next block 921, the search engine server portion delivers the results page containing statistics and similarities with title and correlated image areas. At a next decision block 923, the search engine server portion determines if more similarities within the same webpage image or in another webpage image are found. If yes, then the processes of blocks 919 and 921 are repeated to generate addition results pages. If not, at a final block 925, the functionality ends.

Figure 10:
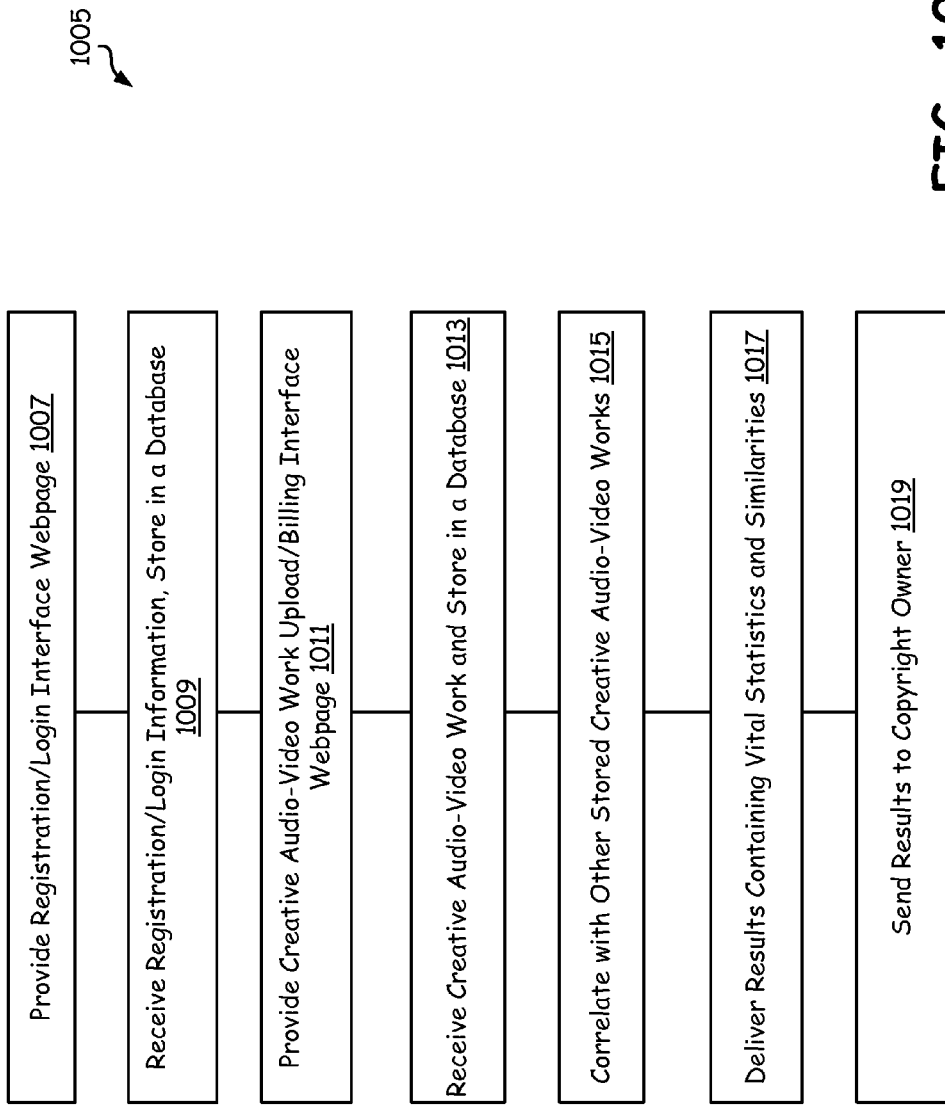
FIG. 10 is a flow diagram illustrating functionality of a portion of the search engine server of FIG. 2.

FIG. 10 is a flow diagram illustrating functionality 1005 of a portion of the search engine server of FIG. 2. The functionality of a portion of the search engine server (hereafter, search engine server portion) begins at a block 1007 when an owner of a creative audio-video work is provided with registration/login interface webpage. At a next block 1009, the search engine server portion receives registration information (for the first time) and stores this information in a database. In subsequent interactions, the search engine server portion verifies login information and allows the owner to access services of the search engine server portion. The registration information may contain user name, password, date of birth, address, email address and other relevant information.

At a next block 1011, the search engine server portion provides creative audio-video work upload/billing webpage interface. The owner may upload any number of creative audio-video works in subsequent visits (after initial registration), and the billing may occur on one of many possible ways. This includes a fixed price/creative audio-video work, fixed price/second of the creative audio-video work, fixed price/report generated for a predetermined period such as a week or month, etc. That is, the billing may occur immediately after uploading of creative audio-video works or may occur periodically based upon an agreement with the registered owner. The service may be provided for a fixed period of time such as one year or two years depending upon agreement with the registered owner.

At a next block 1013, the search engine server portion receives creative audio-video works and stores them in a database. At a next block 1015, the search engine server portion correlates the creative audio-video work with that of web content, vectors of which are delivered by the search engine server during crawling operation. Then, search engine server portion generates a report containing all of the website links that contain audio-video content having similarities with that of content of creative audio-video works. At a next block 1017, the search engine server portion delivers results containing statistics of the creative audio-video works, along with similarities found. In a final block 1019, the search engine server portion sends results to the registered owner, and upon agreement with registered owner and host third party servers, to the host third party servers.

Figure 11:
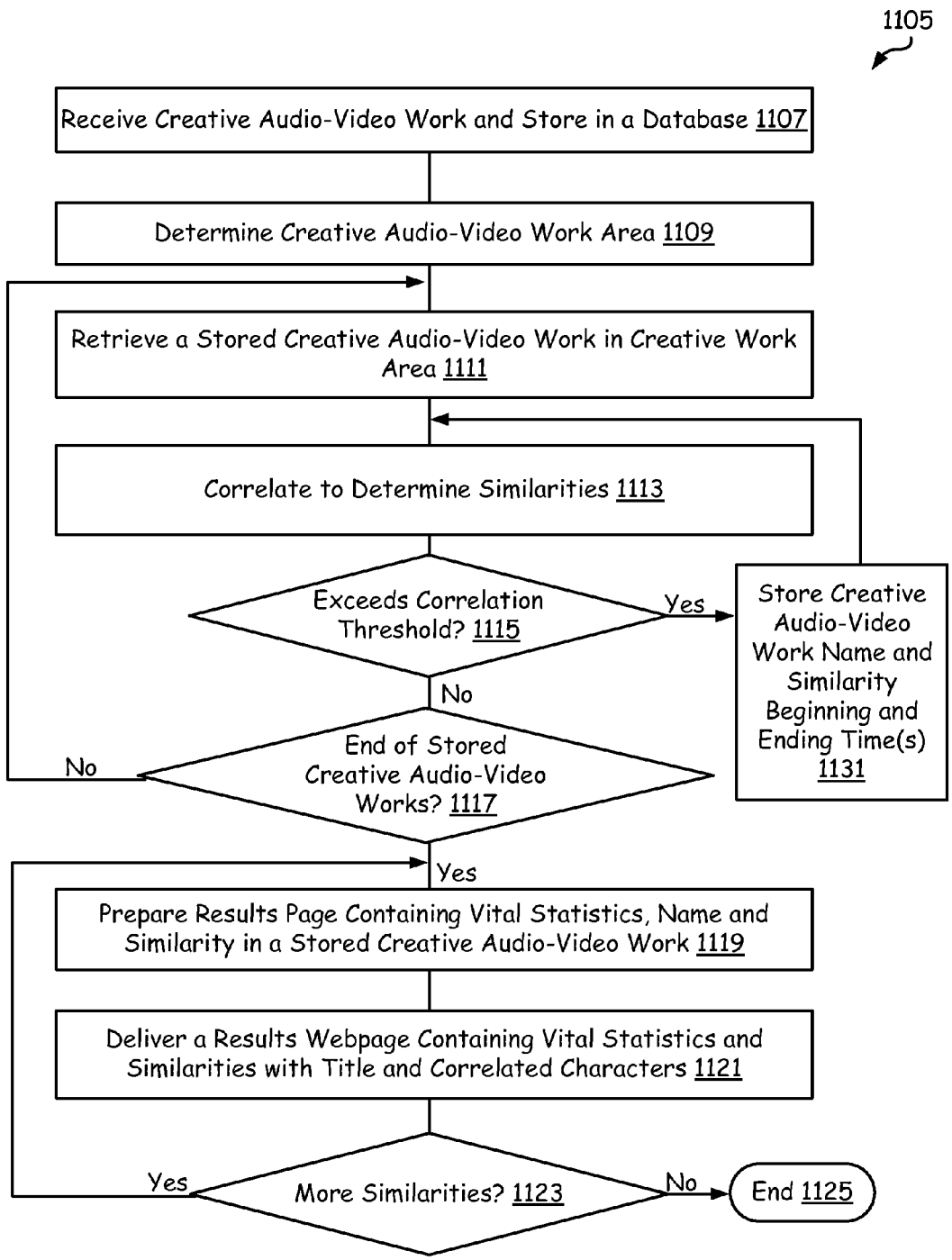
FIG. 11 is a flow diagram illustrating functionality of a portion of the search engine server of FIG. 2 in detail, with the creative work containing audio-video content in consideration.

FIG. 11 is a flow diagram illustrating functionality 1105 of a portion of the search engine server of FIG. 2 in detail, with the creative work containing audio-video content in consideration. The detailed functionality concerning creative audio-video works begins at a block 1107, where the search engine server portion receives creative audio-video works and stores them in a database. The search engine server portion provides webpage interfaces to registered owner of the creative audio-video works to upload one or more creative audio-video works. At a next block 1109, the search engine server portion determines the area of the creative audio-video work. For example, the area may be: (i) In case of creative audio works—rock music, country music, regional music belonging to various categories, etc. and (ii) In case of video works—motion pictures, educational material, personal videos etc. The area of the creative audio-video work is determined only if the registered owner provides such information. In this case, the search engine server portion may not compare with web audio-video content that does not belong to the area of creative audio-video work.

At a next block 1111, the search engine server portion retrieves stored creative audio-video work in a given audio-video area. At a next block 1113, the search engine server portion correlates audio-video works with that of web audio-video content to determine similarities. In case of audio recordings, bit by bit comparison may be employed. Alternatively, in some cases, the search engine server portion may resort to converting the recordings to analog forms and then comparing them. In case of video recordings, the digital signatures are identified and compared as a first step. As a next step, the comparison of audio portion of the video recording is performed and then, if no similarities are found, the video portion of the recording are compared. The video portion comparison may occur on the basis of frame by frame comparison. Other methods of comparison are also contemplated. The reader should understand that by comparing audio portions of audio-video content, correlation between works may be relatively easily determined. Such comparison provides an efficient mechanism for determining if motion pictures illegally reside upon a server for example, without requiring a video content to video content comparison, which may not be effective due to differences in format sizes, resolutions, frame rates, etc. When comparing audio portions of audio-video content, digital information of an audio bit stream may be compared. Alternately, the audio portion of two (or more) audio-video files may be converted to the frequency domain and the two (or more) audio portions may be compared.

At a next decision block 1115, the search engine server portion determines if the similarities exceed a predetermined correlation threshold. In case of audio recordings (or audio portions of audio-video recordings), the correlation threshold may be a predetermined number of adjacent bits, spectral component samples, and in case of video this may be a predetermined number of adjacent frames. If yes at the decision block 1115, then the search engine server portion stores creative audio-video work name, vectors for web audio-video content along with similarity beginning and ending times, at a next block 1131. Then, the processes of blocks 1113 and 1115 are repeated. If not at the decision block 1115, at a next decision block 1117, the search engine server portion determines if all of the creative audio-video works of the registered owner are correlated. If not, with a next creative audio-video work, the processes of blocks 1111, 1113, 1115 and 1131 are repeated.

If yes at the decision block 1117, then the search engine server portion prepares a results page (from the stored information of similarities) containing statistics, name and web links of the audio-video content that contains similarities along with additional information, at a next block 1119. Then, at a next block 1121, the search engine server portion delivers the results page containing statistics and similarities with title and correlated audio-video times. At a next decision block 1123, the search engine server portion determines if more similarities within the same audio-video content or in another audio-video content are found. If yes, then the processes of blocks 1119 and 1121 are repeated to generate addition results pages. If not, at a final block 1125, the functionality ends.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A web search infrastructure supporting a plurality of creative works owners of a plurality of creative works, the plurality of creative works including video works, the web search infrastructure comprising:
   a first communication interface through which each of the plurality of creative works owners can register their creative works;
   at least one storage that contains first data associated with a first group of creative works and second data associated with a second group of creative works, the first data being associated with the registration by each of the plurality of creative works owners, and the second data obtained during a search engine crawling process, the search engine crawling process includes identifying the second group of creative works from at least one of a plurality of web hosting servers responsible for hosting the second group of creative works;
   a processor that:
      identifies matches between the first data and the second data; and supports converting each creative work of the first group of creative works and the second group of creative works to a predetermined format to generate converted instances of the first group of creative works and converted instances of the second group of creative works, wherein the first data is associated with the converted instances of the first group of creative works and the second data is associated with the converted instances of the second group of creative works a billing service that charges a first fee to each of the plurality of creative works owners for services rendered and charges an additional fee to each of the plurality of creative works owners for supporting communications with at least one of the plurality of web hosting servers, the communications regarding at least a portion of match-related information; and a first hypertext markup language interface that supports a display of match-related information for each of the plurality of creative works owners, wherein the display includes an area of work identifier.

2. The web search infrastructure of claim 1, wherein:
the match-related information identifies the second group of creative works and the first group of creative works associated with the matches;
the first group of creative works comprises a first portion of the creative works registered by one of the plurality of creative works owners; and
the first hypertext markup language interface supports a display of match-related information associated with the first portion of the creative works for the one of the plurality of creative works owners.

3. The web search infrastructure of claim 1, the match-related information includes third-party hosting information associated with the matches identified.

4. The web search infrastructure of claim 1, the search engine crawling process includes receiving vectors of the second group of creative works, the second group of creative works comprises web content.

5. The web search infrastructure of claim 1, the first hypertext markup language interface supports communication regarding at least a portion of the match-related information with the at least one of the plurality of web hosting servers.

6. The web search infrastructure of claim 1, identifying matches between the first data and the second data includes determining a correlation between at least some of the first group of creative works associated with the first data and at least some of the second group of creative works associated with the second data.

7. The web search infrastructure of claim 1, the converted instances of the second group of creative works generated in response to a determination that the second group of creative works belong to a common creative area as the first group of creative works.

8. A web search infrastructure supporting a plurality of creative video works owners, the web search infrastructure comprising:
a first communication interface through which the plurality of creative video works owners can register their plurality of creative video works;
a first processing infrastructure that:
obtains first data associated with a plurality of hosted video content from at least one of a plurality of web hosting servers via a search engine crawling process, the search engine crawling process includes identifying the hosted video content from at least one of a plurality of web hosting servers responsible for hosting the hosted video content; and
supports converting each of the plurality of creative video works and each of the plurality of hosted video content to a predetermined format;
a second processing infrastructure that identifies matches between the first data and second data associated with the registrations by each of the plurality of creative video works owners;
the second processing infrastructure via the first communication interface supports visual presentations for each of the plurality of creative video works owners regarding information associated with the matches, the second processing infrastructure enables each of the plurality of creative video works owners to authorize communications regarding the matches to a selected portion of the web hosting servers responsible for hosting a selected subset of hosted video content, wherein the visual presentations include an area of work identifier; and
the second processing infrastructure, via the first communication interface, supports communication regarding at least a portion of the information associated with the matches only with the selected portion of web hosting servers.

9. The web search infrastructure of claim 8, wherein:
the information associated with the matches identifies the hosted video content and the plurality of creative video works associated with the matches;
the plurality of creative video works associated with the matches comprises a first portion of the plurality of creative video works registered by one of the plurality of creative video works owners; and
the second processing infrastructure via the first communication interface supports visual presentations for the one of the plurality of creative video works owners.

10. The web search infrastructure of claim 8, the information associated with the matches includes third-party hosting information associated with the matches identified.

11. The web search infrastructure of claim 8, the web search infrastructure comprising a billing service that charges the plurality of creative video works owners for services rendered.

12. The web search infrastructure of claim 8, the search engine crawling process supporting browser-based web searching.

13. The web search infrastructure of claim 8, identifying matches between the first data and the second data includes determining a correlation between at least some of the hosted video content associated with the first data and at least some of the registrations associated with the second data.

14. A web search infrastructure supporting a plurality of creative works owners of a plurality of creative works, the plurality of creative works including audio works, the web search infrastructure comprising:
a first communication interface through which each of the plurality of creative works owners can register their creative works;
at least one storage that contains first data associated with a first group of creative works and second data associated with a second group of creative works, the first data being associated with the registration by each of the plurality of creative works owners, and the second data obtained during a search engine crawling process, the search engine crawling process includes identifying the second group of creative works from a plurality of web hosting servers responsible for hosting the second group of creative works, at least a portion of the plurality of web hosting servers configured, prior to initiation of the search engine crawling process, to respond to matches associated with the second data;

a processor that:
    identifies matches between the first data and the second data; and
    supports converting each creative work of the first group of creative works and the second group of creative works to a predetermined format to generate converted instances of the first group of creative works and converted instances of the second group of creative works, wherein the first data is associated with the converted instances of the first group of creative works and the second data is associated with the converted instances of the second group of creative works;

a first hypertext markup language interface that supports a display of match-related information for each of the plurality of creative works owners; and the first hypertext markup language interface supports communication regarding at least a portion of the match-related information with only the portion of the plurality of web hosting servers configured, prior to initiation of the search engine crawling process, to respond to matches associated with the second data.

15. The web search infrastructure of claim 14, wherein:
    the match-related information identifies the second group of creative works and the first group of creative works associated with the matches;
    the first group of creative works comprises a first portion of the creative works registered by one of the plurality of creative works owners; and
    the first hypertext markup language interface supports a display of match-related information associated with the first portion of the creative works for the one of the plurality of creative works owners.

16. The web search infrastructure of claim 14, the match-related information includes third-party hosting information associated with the matches identified.

17. The web search infrastructure of claim 14, the web search infrastructure comprising a billing service that charges the plurality of creative works owners for services rendered.

18. The web search infrastructure of claim 14, the search engine crawling process includes receiving vectors of the second group of creative works, the second group of creative works comprises web content.

19. The web search infrastructure of claim 14, identifying matches between the first data and the second data includes determining a correlation between at least some of the first group of creative works associated with the first data and at least some of the second group of creative works associated with the second data.

20. The web search infrastructure of claim 14, the converted instances of the second group of creative works generated in response to a determination that the second group of creative works belong to a common creative area as the first group of creative works.

* * * * *